No. 851,769. PATENTED APR. 30, 1907.
G. NELSON.
COMBINED CIGAR CUTTER AND PIPE CLEANER.
APPLICATION FILED FEB. 4, 1907.

Witnesses:
Inventor.
George Nelson,
By Benedict, Morsell & Caldwell,
Attorneys.

UNITED STATES PATENT OFFICE.

GEORGE NELSON, OF MILWAUKEE, WISCONSIN.

COMBINED CIGAR-CUTTER AND PIPE-CLEANER.

No. 851,769.  Specification of Letters Patent.  Patented April 30, 1907.

Application filed February 4, 1907. Serial No. 355,558.

*To all whom it may concern:*

Be it known that I, GEORGE NELSON, residing in Milwaukee, in the county of Milwaukee and State of Wisconsin, have invented new and useful Improvements in a Combined Cigar-Cutter and Pipe-Cleaner, of which the following is a description, reference being had to the accompanying drawings, which are a part of this specification.

This invention has for its object to provide an implement for smoker's use which will be useful in cutting off the ends of cigars and for cleaning smoking pipes.

Another object of the invention is to produce such a device which will be simple in its construction and inexpensive to manufacture, while being durable and efficient in use.

With the above and other objects in view the invention consists in the combined cigar cutter and pipe cleaner as herein claimed, and all equivalents.

Figure 1:
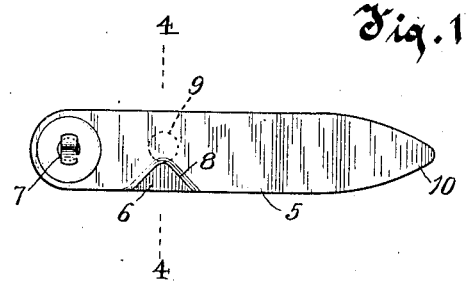
Figure 2:
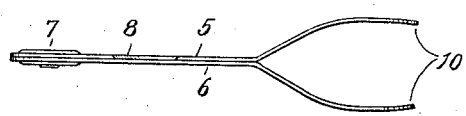
Figure 3:
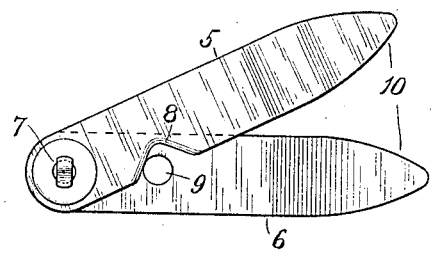
Figure 4:
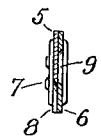

Referring to the accompanying drawings in which like characters of reference indicate the same parts in the several views; Figure 1 is a plan view of a combined cigar cutter and pipe cleaner constructed in accordance with this invention, with the members in their closed position; Fig. 2 is an edge view thereof; Fig. 3 is a view similar to Fig. 1 with the members of the device in their open position; and, Fig. 4 is a sectional view on the plane of line 4—4 of Fig. 1.

In these drawings 5 and 6 represent a pair of members which comprise strips of sheet spring metal pivotally connected together at one end by having a rivet 7 passing therethrough, or in any other suitable manner. The member 5 has a V-shaped notch 8 formed in one edge thereof and the member 6 has a round opening 9 therein to register with the V-shaped notch 8. The notch 8 and the opening 9 have their edges beveled outwardly so as to produce knife edges at the meeting surfaces of the two members and these knife edges coöperate with each other to produce a double shearing action for cutting off the end of a cigar when placed through the opening 9.

The operation in cutting the end of a cigar is obvious, the members being separated as shown in Fig. 3, so as to bring the notch 8 and the opening 9 in register and the cigar tip being entered through the opening 9 and the members forced together to the position shown in Fig. 1. The cut produced by the coöperation of the opening 9 with the V-shaped notch 8 will be clean and the cigar will not be crushed or mutilated in the operation. The outer ends of the members 5 and 6 are bent away from each other and are bowed and pointed to form a pair of scrapers 10 which may be inserted in the bowl of a smoking pipe for cleaning the same. The scrapers by their spring action fit the surface of the pipe bowl as they are forced therein and on being turned remove all matter which has accumulated on the walls of the pipe bowl. The scrapers 10 may be made to fit against the walls of pipe bowls of larger size by slightly separating the members 5 and 6 so as to spread them apart.

The combined cigar cutter and pipe cleaner of this invention forms a very useful implement for smoker's use which may be conveniently carried in the pocket, and being inexpensive to manufacture and efficient in its operation forms a very suitable advertising novelty.

What I claim as my invention is;

A combined cigar cutter and pipe cleaner, comprising a pair of strips of spring metal forming members pivoted together at one end and provided with a knife edged opening and a knife edged registering notch respectively for cutting the ends from cigars, and scrapers formed on the outer ends of the members by the ends of the spring strips being pointed and arched so as to stand apart with spring action and constituting means for cleaning the bowl of a smoking pipe on being inserted therein and turned, the flexible pointed ends of the scrapers conforming to the curvature of the bowl when placed therein, said scrapers being capable of being spread apart to engage the walls of the pipe bowl by moving the members with relation to each other.

In testimony whereof, I affix my signature, in presence of two witnesses.

GEORGE NELSON.

Witnesses:
R. S. C. CALDWELL,
ANNA F. SCHMIDTBAUER.